United States Patent [19]

Boshek

[11] Patent Number: 5,219,130
[45] Date of Patent: Jun. 15, 1993

[54] HUB LOCK FOR VIDEO CASSETTE
[75] Inventor: Ernest D. Boshek, San Jose, Calif.
[73] Assignee: Tandy Corporation, Ft. Worth, Tex.
[21] Appl. No.: 898,249
[22] Filed: Jun. 12, 1992

Related U.S. Application Data

[63] Continuation of Ser. No. 713,538, Jun. 6, 1991, abandoned, which is a continuation of Ser. No. 457,991, Dec. 28, 1989, abandoned.

[51] Int. Cl.[5] .................................. G11B 23/087
[52] U.S. Cl. .................................................. 242/199
[58] Field of Search ........................... 242/197–200; 360/132

[56] References Cited

U.S. PATENT DOCUMENTS

| | | | |
|---|---|---|---|
| 4,309,002 | 1/1982 | Saitou et al. | 242/198 |
| 4,512,534 | 4/1985 | Coy, Jr. et al. | 242/198 |
| 4,638,393 | 1/1987 | Oishi et al. | 242/198 X |
| 4,728,056 | 3/1988 | Onmori et al. | 242/198 |

FOREIGN PATENT DOCUMENTS 2089765 6/1982 United Kingdom .
2104872 3/1983 United Kingdom .

OTHER PUBLICATIONS

VHS Video Cassette System Standard, Compact Video Cassette FIGS. 2.2 and 7, May 1982.

*Primary Examiner*—Daniel P. Stodola
*Assistant Examiner*—William G. Battista, Jr.
*Attorney, Agent, or Firm*—Townsend and Townsend

[57] ABSTRACT

A reel-locking device for a video cassette. One or more stationary teeth are positioned to engage corresponding teeth on the perimeter of the video cassette tape reel. When the video cassette is inserted into a recorder, the recorder causes the reel to be raised above the effective height of the stationary tooth to disengage the reel from the tooth and permit rotation thereof.

5 Claims, 2 Drawing Sheets

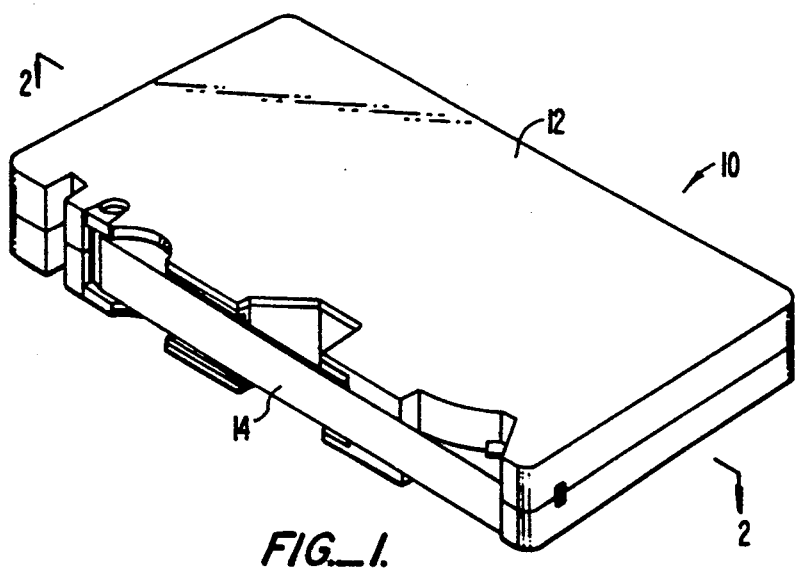
FIG._1.
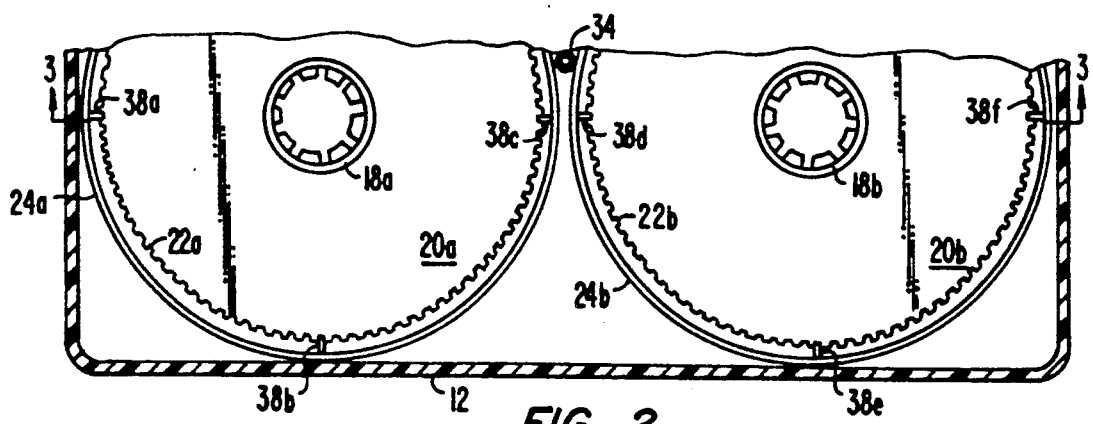
FIG._2.
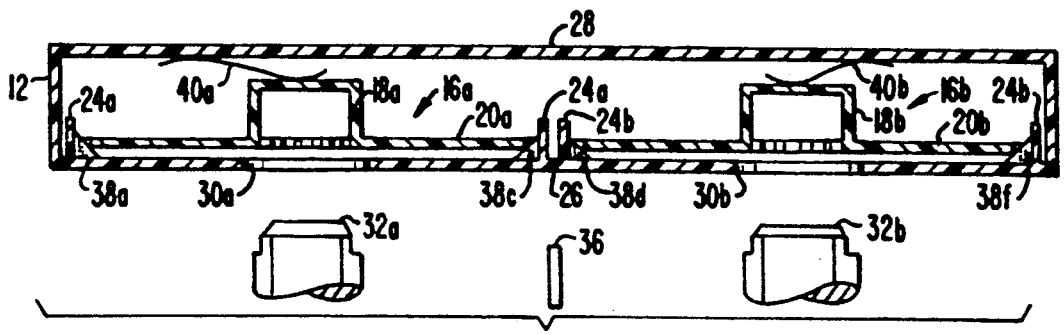
FIG._3.

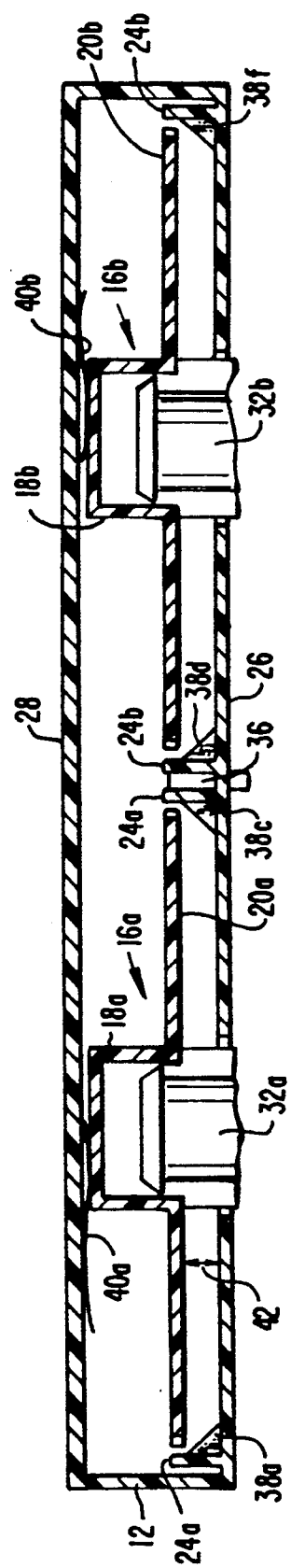
FIG._4.
FIG._5.

HUB LOCK FOR VIDEO CASSETTE

This is a continuation of application Ser. No. 07/713,538 filed Jun. 6, 1991, now abandoned, which is a continuation of application Ser. No. 07/457,991, filed Dec. 28, 1989, now abandoned.

BACKGROUND OF THE INVENTION

The present invention relates to a video cassette and, particularly, to a mechanism for locking the hubs of the cassette when the cassette is not in use.

Video cassettes are well known for providing video tape in a package usable by a video cassette recorder. The tape included in a video cassette recorder is typically very lightweight and easily damaged or deformed. For this reason, video cassettes commonly include a mechanism for locking the hubs on which the tape is wound. The mechanism is intended to prevent rotation of the hubs and possible movement of the tape, while the cassette is not in use. Previously used hub lock mechanisms include those described in U.S. Pat. No. 4,512,534, incorporated herein by reference. Typical hub locks include movable tooth mechanisms which engage corresponding teeth arrayed along the perimeter of flanges connected to the hubs. When the cassette is inserted into a video recorder, a probe enters the cassette through a hole and engages the hub lock mechanism. The probe causes the hub lock mechanism to move in such a manner as to retract the teeth which engage the perimeter of the flanges, thus permitting rotation of the hubs.

SUMMARY OF THE INVENTION

The present invention includes the recognition of certain difficulties associated with previous hub lock devices. Because the previous hub lock devices included a number of moving parts, such devices were subject to malfunction or breakage. Furthermore, the locking mechanism used in previous devices included relatively expensive parts and assembly techniques.

The present invention involves providing non-movable teeth for engaging corresponding teeth along the perimeter of the hub flanges. Rather than requiring movement of the locking teeth in order to free the reels for rotation, the present invention takes advantage of upward movement of the hubs by the hub drive mechanism to free the hub flanges from the stationary locking teeth.

BRIEF DESCRIPTION OF THE DRAWINGS

FIG. 1 is a perspective view of a video cassette usable in connection with the present invention;

FIG. 2 is a partial cross-section taken along line 2—2 of FIG. 1;

FIG. 3 is a cross-section taken along line 3—3 of FIG. 2, and showing the hub drive members of a video recorder in a non-engaging position; and FIG. 4 is a cross-section similar to FIG. 3, but showing the hub drive devices in engaged position and the hubs in an unlocked position.

FIG. 5 shows an alternate embodiment of the invention.

DETAILED DESCRIPTION OF THE PREFERRED EMBODIMENT

As shown in FIG. 1, a video cassette 10 includes a housing 12 for holding a tape 14. As shown in FIG. 2, the tape 14 is wound around two reels 16a, 16b which include hubs 18a, 18b and flanges 20a, 20b. The flanges 20a, 20b contain a plurality of evenly spaced teeth 22a, 22b around their perimeters. The reels 16a, 16b are contained within an annular guard wall 24a, 24b.

For ease of discussion, the major wall of the housing 12 which is closest to the flanges 20a, 20b will be referred to as the "bottom wall" 26, while the opposite major wall will be referred to as the "top" or "upper wall" 28. The bottom wall 26 includes first and second openings 30a, 30b for receiving reel drive devices 32a, 32b, used for driving or permitting rotation of the reels 16a, 16b in a manner well known for video cassette recorders. The openings 30a, 30b are aligned with complementary openings in the hubs 18a, 18b for receiving the drive devices 32a, 32b. Also provided in the bottom wall 26 is a third opening 34 for receiving a probe 36. In previous devices, the probe 36 is employed to engage and unlock a movable locking mechanism to permit rotation of the reels 16a, 16b. In the present invention, however, the probe 36 does not perform any unlocking function. But, because the probe 36 is present in typical video cassette recorder devices, the hole 34 must be provided for receiving the probe 36 since, otherwise, the probe 36 would strike the bottom surface 26 of the cassette 10, and proper functioning of the video cassette recorder would be interfered with.

Extending inwardly from the bottom edge of the guard walls 24a, 24b are one or more stationary locking teeth 38a, 38b, 38c, 38d, 38e, 38f. The teeth 38a–38f engage the flange teeth 22a, 22b, as depicted in FIG. 2. Engagement with the flange teeth 22a, 22b is assured because the flanges 20a, 20b are urged in a direction toward the lower wall 26 by leaf springs 40a, 40b. Because of the engagement between the stationary teeth 38a–38f and the flange teeth 22a, 22b, the reels 16a, 16b are prevented from rotating.

The teeth 38a–38f can be in any of a number of configurations suitable for engagement with the flange teeth 22a, 22b. In the depicted embodiment, the teeth 38a–38f are in the shape of triangular projections lying in a vertical plane. Preferably, the teeth 38a–38f are formed integrally with the guard walls 24a, 24b, such as by injection-molding. In an alternative embodiment, depicted in FIG. 5, the teeth 38' are in the form of a wire or other low-profile object extending through a hole in the guard wall 24a.

When the video cassette is inserted into the video cassette recorder and the playing or recording mechanism is engaged, the reels 16a, 16b are disengaged from the stationary locking teeth 38a–38f in the following manner. The video cassette recorder mechanism causes the reel drive devices 32a, 32b to be moved upward, and to engage the reels 16a, 16b in a manner well known for video cassette recorders. At the same time, the probe 36 enters the hole 34 in the lower wall 26. Upward movement of the drive members 32a, 32b raises the reels 16a, 16b, against the urging of the springs 40a, 40b, at least a predetermined height 42. The height 42 is at least equal to the effective height of the teeth 38a–38f, i.e., the height of the teeth which are effective to engage and lock the reels 16a, 16b. Because the flanges 20a, 20b are raised above the effective height of the teeth 38a–38f, the teeth 38a–38f no longer are engaged with the flange teeth 22a, 22b. Accordingly, the reels 16a, 16b are now unlocked and can be rotated by the drive devices 32a, 32b.

When the video cassette recorder 10 is disengaged from the video cassette recorder, the drive devices 32a, 32b are withdrawn from the video cassette 10, permitting the springs 40a, 40b to return the reels 16a, 16b to the lowermost position depicted in FIG. 3, once again causing locking engagement of the stationary teeth 38a–38f with the flange teeth 22a, 22b.

As will be apparent to those skilled in the art, a number of variations and modifications of the described invention can also be used. By way of example, the locking mechanism described can be used in connection with cleaning cassettes as well as video recording cassettes. Although the tape used in cleaning cassettes is typically heavier and less subject to deformation or damage than is video recording tape, it is, nevertheless, advantageous to provide locking for cleaning cassettes, particularly during shipment thereof. More or fewer teeth than those depicted in the present invention can be used. The teeth can be in shapes other than those depicted, provided they have an effective height which is cleared when the reels are raised by the drive device. Although the depicted embodiment includes a stationary tooth extending into a gap between two flange teeth, the male/female relationship of the locking device can be reversed. The locking mechanism can be configured to engage the bottom portion of the flange, rather than the perimeter thereof.

Although the invention has been described by way of a preferred embodiment and other modifications and variations, additional modifications and variations can also be used, the scope of the invention being described in the appended claims.

What is claimed is:

1. A cassette, substantially enclosing a length of tape for use in a video cassette recorder, the recorder including a device for engaging the cassette, the cassette comprising:

a housing having an upper wall and a bottom wall;
    at least a first reel having a flange, said flange movable from a first vertical position, spaced a first distance from said bottom wall when said cassette is disengaged from said recorder, to a second vertical position space da second distance from said bottom wall when said cassette is engaged by said device for engaging, said second distance being greater than said first distance; and
    stationary means for engaging said flange to lock said reel against rotation, said means having an effective locking height wherein said stationary means is disengaged from said reel when said reel is in said second position, said stationary means comprising at least a first triangular shaped member lying in a substantially vertical plane.

2. A cassette, as claimed in claim 1, wherein:
    said flange includes at least one tooth along its perimeter; and
    said stationary means is configured for engaging said flange tooth.

3. A cassette, as claimed in claim 1, further comprising means in said bottom wall for receiving a probe contained in a video cassette recorder.

4. A cassette, as claimed in claim 1, further comprising a guard wall at least partially surrounding said first reel, said stationary means extending inwardly from said guard wall.

5. A cassette, as claimed in claim 1, further comprising a second reel, wherein said means for engaging is effective to lock said second reel.

* * * * *